(12) United States Patent
Fujiwara et al.

(10) Patent No.: US 6,507,851 B1
(45) Date of Patent: Jan. 14, 2003

(54) CUSTOMER INFORMATION RETRIEVING METHOD, A CUSTOMER INFORMATION RETRIEVING APPARATUS, A DATA PREPARATION METHOD, AND A DATABASE

(75) Inventors: Yoshihito Fujiwara, Kanagawa (JP); Naotaka Ando, Saitama (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/452,418

(22) Filed: Dec. 1, 1999

(30) Foreign Application Priority Data

Dec. 3, 1998 (JP) .......................................... 10-344357

(51) Int. Cl.[7] .............................................. G06F 17/30
(52) U.S. Cl. ................................................. 707/104.1
(58) Field of Search ................................. 707/3, 4, 5, 6, 707/100, 110, 104.1; 705/1, 14, 30; 600/300

(56) References Cited

U.S. PATENT DOCUMENTS

| | | | | |
|---|---|---|---|---|
| 5,908,383 A | * | 6/1999 | Brynjestad | 128/920 |
| 6,112,181 A | * | 8/2000 | Shear et al. | 705/1 |
| 6,286,005 B1 | * | 9/2001 | Cannon | 455/2.01 |
| 2001/0014868 A1 | * | 8/2001 | Herz et al. | 705/104 |

* cited by examiner

Primary Examiner—Diane D. Mizrahi
Assistant Examiner—Apu M Mofiz
(74) Attorney, Agent, or Firm—Frommer Lawerence & Haug LLP; William S. Frommer; Glenn F. Savit

(57) ABSTRACT

The improvement of accuracy is provided in extracting a rule in customers. A customer database DB1 is constructed by storing customer inner information concerning the mental side, which includes a value sense of each customer, and customer outer information which includes basic attributes consisting of at least sexuality and age of each customer.

4 Claims, 13 Drawing Sheets

| PROFILE ITEM / CUSTOMER ID | DEMOGRAPHIC INFORMATION | | | | | | | PRODUCT/SERVICE PURCHASE/USE HISTORY | | | | PERSONALITY DATA | | | | | |
|---|---|---|---|---|---|---|---|---|---|---|---|---|---|---|---|---|---|
| | NAME | TELEPHONE NUMBER | ADDRESS CODE | SEXUALITY | AGE | FAMILY CODE | YEARLY INCOME CODE | PRODUCT CODE | PURCHASE DATA & TIME | PRODUCT CODE | ... | QUESTION 1 | QUESTION 2 | QUESTION 3 | ... | QUESTION 17 | QUESTION 18 |
| 100,000,001 | ANDO | 2544 | 27 | 1 | 35 | 2 | 3 | 3 | 1999,4,01 | 7 | ... | 5 | 3 | 4 | ... | 2 | 1 |
| 100,000,002 | TANAKA | 2878 | 32 | 1 | 24 | 4 | 4 | 7 | 1999,4,03 | 6 | ... | 4 | 2 | 1 | ... | 3 | 4 |
| 100,000,003 | YAMASHITA | 1112 | 14 | 2 | 47 | 1 | 6 | 7 | 1999,4,15 | 4 | ... | 5 | 1 | 1 | ... | 5 | 4 |
| 100,000,004 | SUZUKI | 7847 | 41 | 1 | 18 | 3 | 0 | 2 | 1999,5,17 | 4 | ... | 2 | 1 | 3 | ... | 1 | 5 |
| 100,000,005 | SAITO | 6245 | 22 | 2 | 33 | 3 | 2 | 1 | 1999,5,08 | 8 | ... | 5 | 1 | 5 | ... | 3 | 3 |
| ...... | ...... | | | | | | | | | | | | | | | | |
| 109,999,998 | YAMADA | 1383 | 27 | 2 | 42 | 4 | 3 | 7 | 2001,7,17 | 5 | ... | 1 | 2 | 1 | ... | 3 | 2 |
| 109,999,999 | SHIMIZU | 2998 | 13 | 1 | 51 | 2 | 8 | 7 | 2001,8,27 | 4 | ... | 2 | 4 | 5 | ... | 2 | 4 |
| 110,000,000 | KAWASAKI | 6555 | 12 | 1 | 21 | 1 | 2 | 6 | 2001,9,12 | 2 | ... | 5 | 5 | 4 | ... | 4 | 5 |

DB1 CUSTOMER DATABASE

FIG.2

| PROFILE ITEM | DEMOGRAPHIC INFORMATION | | | | | PRODUCT/SERVICE PURCHASE/USE HISTORY | | | | PERSONALITY DATA | | | | | | HOBBY/PREFERENCE DATA | | | |
|---|---|---|---|---|---|---|---|---|---|---|---|---|---|---|---|---|---|---|---|
| CUSTOMER ID | ADDRESS CODE | SEXUALITY | AGE | FAMILY CODE | YEARLY INCOME CODE | PRODUCT CODE | PURCHASE DATA & TIME | PRODUCT CODE | ... | QUESTION 1 | QUESTION 2 | QUESTION 3 | ... | QUESTION 17 | QUESTION 18 | ... | QUESTION 1 | QUESTION 2 | QUESTION 3 | ... |
| 001 | 27 | 1 | 35 | 2 | 3 | 3 | 1999,4,01 | 7 | ... | 5 | 3 | 4 | ... | 2 | 1 | ... | 5 | 3 | 4 | ... |
| 002 | 32 | 1 | 24 | 4 | 4 | 7 | 1999,4,03 | 6 | ... | 4 | 2 | 1 | ... | 3 | 4 | ... | 4 | 2 | 1 | ... |
| 003 | 14 | 2 | 47 | 1 | 6 | 7 | 1999,4,15 | 4 | ... | 5 | 1 | 1 | ... | 5 | 4 | ... | 5 | 1 | 1 | ... |
| 004 | 41 | 1 | 18 | 3 | 0 | 2 | 1999,5,17 | 4 | ... | 2 | 1 | 3 | ... | 1 | 5 | ... | 2 | 1 | 3 | ... |
| 005 | 22 | 2 | 33 | 3 | 2 | 1 | 1999,5,08 | 8 | ... | 5 | 1 | 5 | ... | 3 | 3 | ... | 5 | 1 | 5 | ... |
| ...... | ...... | | | | | | ...... | | | ...... | | | | | | | ...... | | | |
| 998 | 27 | 2 | 42 | 4 | 3 | 7 | 2001,7,17 | 5 | ... | 1 | 2 | 1 | ... | 3 | 2 | ... | 1 | 2 | 1 | ... |
| 999 | 13 | 1 | 51 | 2 | 8 | 7 | 2001,8,27 | 4 | ... | 2 | 4 | 5 | ... | 2 | 4 | ... | 2 | 4 | 5 | ... |
| 1000 | 12 | 1 | 21 | 1 | 2 | 6 | 2001,9,12 | 2 | ... | 5 | 5 | 4 | ... | 4 | 5 | ... | 5 | 5 | 4 | ... |

DB21 — DB22

DB2 LEARNING DATABASE

FIG.4

OUTER DATA

DEMOGRAPHIC
· SEXUALITY, AGE, FAMILY
BEHAVIOR HISTORY
· PURCHASE HISTORY OF AV DEVICES
· SERVICE PURCHASE HISTORY

INNER DATA

PERSONALITY DATA
· CONSCIOUSNESS ABOUT MEDIA
· LIFE STYLE CHARACTERISTIC

PROVISION OF CONTENTS/
SERVICES/PRODUCTS SUITABLE
FOR RESPECTIVE CUSTOMERS

FIG.8C

CUSTOMER INFORMATION RETRIEVING METHOD, A CUSTOMER INFORMATION RETRIEVING APPARATUS, A DATA PREPARATION METHOD, AND A DATABASE

Background of the Invention

1. Technical Field

The present invention relates to a customer information retrieving method and a customer information retrieving apparatus for retrieving a desired customer based on information relating to customers, and to a database consisting of various information. More specifically, the invention relates to a customer information retrieving method, a customer information retrieving apparatus, a data preparation method, and a database which are suitable for retrieving desired customer information based on profiles of customers, such as gender, age, and the like.

2. Background Art

A consumer database has been adopted as a means for searching information to determine future consumer activity. The articles stored in a conventional consumer database are, for example, basic attributes of customers such as gender, age, occupation, and the like and behavior history such as a time-based record of product purchases.

By statistically dealing with data with use of this customer database, a certain rule is found in behavior patterns of customers and utilized for estimation of behaviors of customers.

For example, there may be an analysis result that a man who buys a diaper buys a beer together with high probability.

Data mining is a method for extracting such a rule hidden in a customer database and for assisting determination and has attracted large attention. Attention has been recently paid to the data mining.

Data mining is also a high level method for searching or modeling a cause-effect relationship or pattern hidden in data of a large capacity. This method enables a relationship among complicated data to be established, and is also a mind determination assist method which has attracted attention in recent years in the fields of artificial intelligence, data technology, and the like.

Note that this data mining is applicable to various fields and assists solution to questions as follows: What is the product which customers will buy next where past purchase records are taken into consideration?; when does a processing error take place in dealing with credit cards?; why did customers switch to a rival company?; how can a company recover the customers?; and what is the most suitable method for dividing customers into segments depending on purchase patterns?.

SUMMARY OF THE INVENTION

The present invention recognizes that a conventional database merely compiles superficial behaviors of customers divided into articles. Therefore, thought patterns underlying behaviors of customers cannot be estimated based on the rules extracted from this kind of database.

In addition, even in cases where direct marketing is carried out with individual persons taken as targets, determinations are made only on the basis of information and behaviors as their outer appearances, so effective marketing cannot be achieved.

Further, when performing direct marketing with respect to a particular product or service, a specific segment (e.g., limited to women in their twenties) in a customer database is dealt with as a target of approach. In this method, however, it is difficult to pick up most promising customers with appended orders from a large-scale customer database since customers in the segment are dealt with impartially.

In general cases, data mining extracts a rule between items in a database by analyzing the contents of a customer database. Consequently, it is not possible to extract a relationship between an item existing in a customer database and an item not existing in the customer database. That is, with data mining, unless a target from which a rule should be extracted is clear, a rule cannot be extracted about the item. Hence, it has been said to be difficult to apply an analysis result to business in another field even when an existing database is analyzed.

Therefore, the present invention has been made in view of the above actual situation and has an object of providing a customer information retrieving method, a customer information retrieving apparatus, a data preparation method, and a database, which are capable of improving the accuracy in extracting a rule about customers.

To achieve the above object, in a customer information retrieving method according to the present invention, customer inner information concerning a mental side of each customer and customer outer information which includes at least basic attributes of each customer are stored in storage means, and a potential of a customer for a particular product or service is calculated, based on the customer inner information and the customer outer information stored in the storage means.

That is, in this customer information retrieving method, a potential of a customer for a particular product or service is calculated, based on customer inner information in addition to customer outer information.

The potential calculated by this customer information retrieving method serves as an index which accurately indicates whether or not the customer is a latent customer for a particular product or service.

Also, to achieve the above object, a customer information retrieving apparatus according to the present invention comprises: storage means in which customer inner information concerning a mental side of each customer and customer outer information which includes at least basic attributes of each customer are stored; and potential calculation means for calculating a potential of a customer for a particular product or service, based on the customer inner information and the customer outer information stored in the storage means.

The customer information retrieving apparatus having the structure as described above calculates a potential of a customer for a particular product or service, by the potential calculation means, based on customer inner information in addition to customer outer information stored in the storage means.

The potential calculated by this customer information retrieving apparatus serves as an index which accurately indicates whether or not the customer is a latent customer for a particular product or service.

Also, to achieve the above object, a data preparation method according to the present invention stores customer inner information concerning a mental side of each customer and customer outer information which includes at least basic attributes of each customer stored into storage means.

The potential calculated with use of customer inner information and customer outer information stored in the storage means by the data preparation method serves as an index which accurately indicates whether or not the customer is a latent customer for a particular product or service.

Also, to achieve the above object, a database according to the present invention comprises: first customer information picked up from an existing customer data base consisting of information concerning customers, to obtain a potential of a product or service; and second customer information indicating information concerning customers newly attained to obtain a potential of a product or service. A rule existing in common to the first customer information and the second customer information which the database comprises is extracted.

Information which has already been obtained with respect to a customer is applied to the rule existing in common to the first customer information and the second customer information of the database, thereby to obtain an index which indicates whether or not the customer is a latent customer for a particular product or service.

Also, to achieve the above object, a customer information retrieving method according to the present invention extracts a rule existing in common to first customer information picked up from an existing customer data base consisting of information concerning customers, to obtain a potential of a product or service and second customer information indicating information concerning customers newly attained to obtain a potential of a product or service.

Information which has already been obtained with respect to a customer is applied to the rule existing in common to the first customer information and the second customer information extracted by the customer information retrieving method, thereby to obtain an index which indicates whether or not the customer is a latent customer for a particular product or service.

According to the customer information retrieving method of the present invention, customer inner information concerning a mental side of each customer and customer outer information which includes at least basic attributes of each customer are stored in storage means, and a potential of a customer for a particular product or service is calculated, based on the customer inner information and the customer outer information stored in the storage means. As a result, accuracy in extracting a rule in latent customers can be improved.

Accordingly, it is possible to extract accurately latent customers for a particular product or service by the customer information retrieving method.

Also, the customer information retrieving apparatus according to the present invention comprises: storage means in which customer inner information concerning a mental side of each customer and customer outer information which includes at least basic attributes of each customer are stored; and potential calculation means for calculating a potential of a customer for a particular product or service, based on the customer inner information and the customer outer information stored in the storage means. As a result, the potential of a customer for a particular product or service can be calculated by the potential calculation means, based on the customer inner information and the customer outer information stored in the storage means.

As a result, the customer information retrieving apparatus is capable of improving the accuracy in extracting a rule in latent customers, so that latent customers for a particular product or service can be extracted accurately.

Also, the data preparation method according to the present invention stores customer inner information concerning a mental side of each customer and customer outer information which includes at least basic attributes of each customer stored into storage means. In this manner, it is possible to extract a rule in customers with use of the customer inner information and the customer outer information stored in the storage means. Further, extraction of a rule in latent customers, which is achieved on the basis of the customer inner information and the customer outer information, attains high accuracy.

Thus, according to this data preparation method, latent customers for a particular product or service can be extracted accurately.

Also, the database according to the present invention comprises: first customer information picked up from an existing customer data base consisting of information concerning customers, to obtain a potential of a product or service; and second customer information indicating information concerning customers newly attained to obtain a potential of a product or service. As a result, it is possible to extract a rule existing in common to the first customer information and the second customer information which the database comprises is extracted.

By applying information which has already been obtained with respect to a customer to the rule thus extracted, latent customers for a particular product or service can be accurately extracted, for example.

Also, a customer information retrieving method according to the present invention extracts a rule existing in common to first customer information picked up from an existing customer data base consisting of information concerning customers, to obtain a potential of a product or service and second customer information indicating information concerning customers newly attained to obtain a potential of a product or service. Thus, information which has already been obtained with respect to a customer can be applied to the rule thus extracted. As a result, for example, it is possible to extract accurately latent customers for a particular product or service.

BRIEF DESCRIPTION OF THE DRAWINGS

FIG. 2 shows the structure of a customer database constructed by applying the present invention.

FIG. 4 shows the structure of a learning database constructed by applying the present invention.

FIGS. 8 are views showing a modeled case of extracting latent customers for a particular product or service from inner data and outer data.

DETAILED DESCRIPTION OF THE PREFERRED EMBODIMENTS

In the following, an embodiment of the present invention will be explained specifically with reference to the drawings. In the embodiment, the present invention is applied to a customer information retrieving apparatus for retrieving desired customer information on the basis of compiled information with respect to customers.

Figure 1:
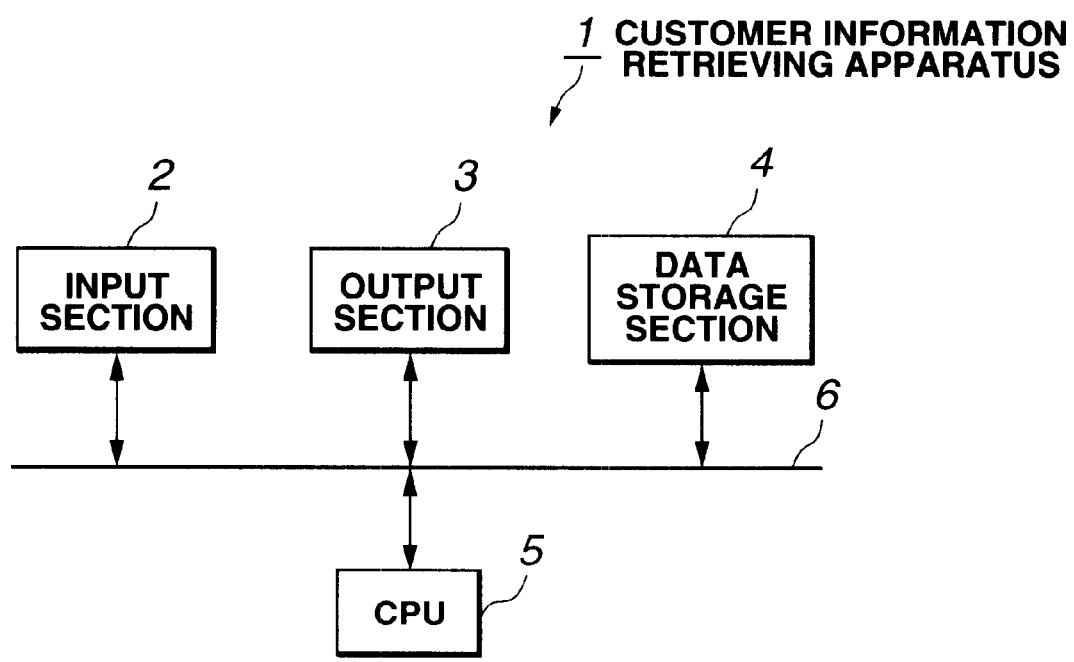
FIG. 1 is a block diagram showing the structure of a customer information retrieving apparatus as an embodiment of the present invention.

As shown in FIG. 1, a customer information retrieving apparatus 1 comprises an input section 2 as an input section for inputting various data, a data storage section 4 for storing data, and a CPU 5 for controlling respective sections forming the customer information retrieving apparatus 1. Further, in the customer information retrieving apparatus 1, the respective sections are connected with each other by the CPU 5 and a bus 6.

In this customer information retrieving apparatus 1, the data storage section 4 is a storage means which compiles customer inner information concerning the mental sides of customers and customer outer information containing at least basic attributes of customers. The CPU 5 has a potential calculation function of calculating a potential with respect to a particular product or service on the basis of the customer inner information and the customer outer information compiled in the data storage section 4.

The input section 2 is constructed as an input means for inputting data. For example, the input section 2 is constructed as an input operation means such as a mouse, keyboard, or the like.

The output section 3 is constructed as an output means for outputting data. For example, the output section 3 is constructed as a display means such as a monitor or the like, or a print output means such as a printer or the like.

The data storage section 4 is constructed as a storage means where various data is stored. Data inputted through the input section 2 is stored into the data storage section 4. Customer inner information, customer outer information, and the like are stored as a customer database or the like in the data storage section 4. The data to be stored in the data storage section 4 will be specifically explained later.

The CPU 5 is constructed as a control means for controlling respective sections of the customer information retrieving apparatus 1. Further, the CPU 5 has a potential calculation function as described above.

Next explanation will be made of the data to be stored in the data storage section 4.

The data storage section 4 stores customer inner information and customer outer information. The customer database which will be described later is constructed by, for example, the customer inner information and customer outer information. Also, the data storage section 4 stores a learning database and a virtual database which will be described later.

The customer outer information is constructed by information relating to basic attributes of customers and behavior histories of customers.

Information concerning basic attributes of customers is generally called demographic information and is constructed by information concerning basic attributes of customers, e.g., gender, age, occupation, family make-up, and the like of each customer.

The information concerning behavior histories of customers, described above, is information consisting of purchase histories of customers with respect to products and services. More specifically, this is history information in the aspect of behaviors of customers such as purchase or use of products or services by customers and also contains information indicating when, where, and what customers did. For example, information in which a record expressing that a customer A bought a product B at a time C in a shop D for a price E is stored on time-base is contained in the information.

The demographic information and the information concerning behavior histories appear superficially or as behaviors of customers and constitute outer data of customers.

The customer inner information is information which relates to the mental side of each customer and contains at least the sense of value of each customer and is also inner data of customers. For example, the customer inner data is information concerning way of thinking about media such as television and magazines, life style, social consciousness, life policy, and the like.

In the data storage section 4, various information as described above is stored as customer profile data of a customer database. FIG. 2 shows an example of a customer database DB, stored in form of spread sheets in which information of one customer is stored in each line.

In the example of FIG. 2, demographic information, product/service purchase/use history, and personality data are profile items, and customers are classified by customer IDs. The customer database DB, in the example shown in FIG. 2 files data equivalent to 10,000,000 persons.

In this example, the demographic information contains items such as "Name", "Telephone number", "Address code", "Gender", "Family code", "Yearly income", and the like. Thus, this information consists of items thus partially coded. Note that this demographic information expresses basic attributes which are adopted in a conventional database and is also information used for so-called computer-assisted name identification information.

In addition, the product/service purchase/use history corresponds to the behavior history and contains items (for each consumer) such as "Product code", "Purchase time", "Product code"(for a second product), and the like. This information consists of items thus partially coded.

Further, the personality data corresponds to customer inner information and is constructed in a preparation method in which the personality data is constructed by response information with respect to "Question 1", "Question 2", "Question 3".

The customer information retrieving apparatus 1 is capable of picking up promising customers with respect to specific products or services from a customer database $DB_1$ constructed as described above. Explanation will be made with respect to specific products or services.

The potential is an index which indicates interest from a customer with respect to a particular product or service and can be obtained by rule extraction based on calculation formulas, for example.

A simple one of possible calculation formulas for a potential F may be a line connection formula express in the following formula (1) in which data items expressed as values are multiplied by coefficients.

$$F = a \times Q1 + b \times Q2 + c \times Q3 + d \times Q4 + e \times Q5 + \quad (1)$$

In the above formula, Q1, Q2, Q3, Q4, Q5, ... are customer profile data and a, b, c, d, e, ... are constants assigned to specific products or services.

Note that the calculation formula for the potential F is not limited to an expression with use of this linear connection formula but can be expressed by various nonlinear calculation formulas. For example, a neural network model using a sigmoid function is one of the possible calculation formulas.

Also, it is possible to guide a potential by the rule form based on the conditional expression (IF sentence) as follows.

$$\text{IF } (Q1 > a \text{ AND } Q2 > b \text{ AND } Q3 > c \text{ AND } Q4 > d \text{ AND } Q5 > e) \text{ THEN } F = X$$

Note that a statistical method based on a linear model corresponds to gender analysis, logistic regression, cluster analysis, or the like, and is suitable for a response to questions including "Why" and "How".

Also, a tree model (called an induction method) as a nonlinear model constructs a decision tree from data. This model is suitable for the case where important parameters are selected and unnecessary forecast factors are deleted.

Further, the neural network as a nonlinear model is capable of forecasting a future result on the basis of history data and is suitable for a response to a question including "What".

The customer information retrieving apparatus 1 adopts the data mining method and calculates potentials of respective customers with respect to particular products or services.

The customer information retrieving apparatus 1 picks up latent customers with respect to a particular product or service, based on potentials obtained for respective customers with respect to the particular product or service. For example, marketing can be performed efficiently in this manner. That is, since inner data expressing mental factors is combined in addition to outer data, i.e., since data which appears superficially from customers or as their behaviors, and data concerning customers inner personalities are combined with each other, individual persons can be effectively selected so that efficient marketing can be achieved. For example, it is possible to send direct mails and the like to those customers who wish to purchase a particular product or service.

In addition, the calculation formula for a potential can be prepared by an arbitrary method. For example, based on various information obtained from customers, a calculation formula for a potential can be prepared from a relationship existing between pieces of information. In general, various parameters can be attained by applying the above-mentioned model to a data set (learning database) in which (target) parameters corresponding to the relationship between profile data of customers and preferences and the like of customers to be forecasted are known.

Figures 3A, 3B:
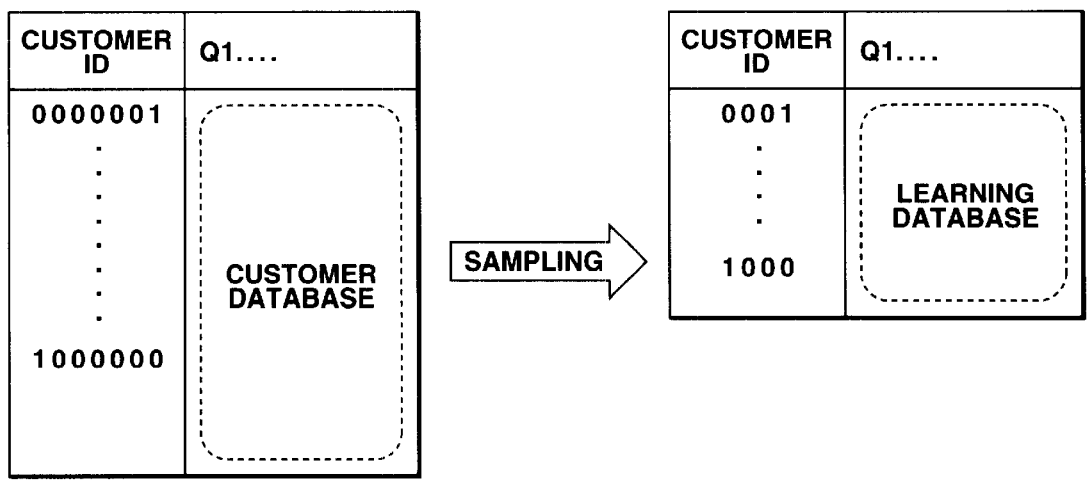
FIG. 3 are views used for explaining a case of preparing a learning database from a customer database.

The learning database has been a database prepared and sampled arbitrarily from a customer database (in FIG. 3(A)), as shown in FIGS. 3(A) and 3(B). Conventionally, forecasting is carried out with use of response data such as direct mails and the like with respect to the customers, based only on the learning database thus consisting only of parts of items of the customer database.

However, the learning database which adopts the present invention is not prepared from the information of the customer database but is constructed by data collected by a completely different method. That is, for example, a learning database is prepared as a database containing items which are not related at all to a customer database, by carrying out a questionnaire investigation for an appropriate number of persons extracted at random or from each classification, about 1,000 to 10,000 persons. FIG. 4 shows a structure example of a learning database $DB_2$ which the customer information retrieving apparatus 1 uses.

As shown in FIG. 4, in the learning database $DB_2$, the questionnaire items are roughly divided into two parts. One part is the database $DB_{21}$ which includes the same items as those of the customer database $DB_1$ such as items of demographic information and product/service purchase/use history, personality data, and the like. The other part is the database $DB_{22}$ which includes the items which are not stored in the customer database but consist of items of target parameters used for determination of latent customers. For example, the items of the database $DB_{22}$ are items of questions which are made for determining latent customers and specifically consist of direct marketing items concerning hobbies and preferences such as purchase requests for various products or services or mental data.

Thus, information which cannot be obtained from a customer database for normal services is prepared as a learning database by carrying out questionnaires according to proper extraction. In this manner, various items which the customer database lacks can be estimated.

Figure 5:
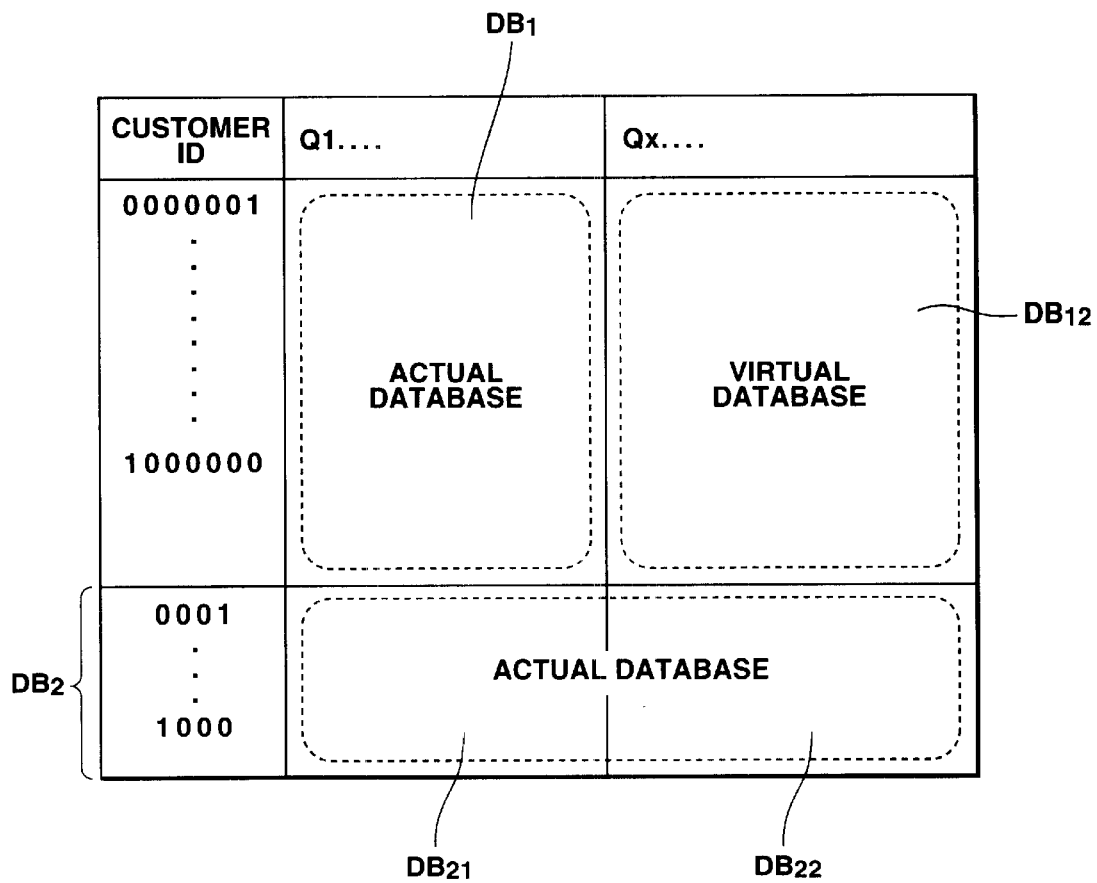
FIG. 5 shows the structure of a database consisting of a customer database and a learning database.

FIG. 5 shows a database constructed so as to contain a learning database as described above. As shown in FIG. 5, the database consists of a customer database $DB_1$, a learning database $DB_2$, and a virtual database $DB_{12}$.

Here, the customer database $DB_1$ consists of items of the database shown in FIG. 2, for example, and contains data items Q1, ... which are common to the customer database and the learning database. In addition, the learning database $DB_2$ is, for example, a learning database $DB_2$ shown in FIG. 4.

The virtual database $DB_{12}$ consists of learning database independent items, which are occupied only by the learning database $DB_2$, and data items Qx, ... This virtual database consists of information estimated by formularization based on extraction of rules from the items of the database $DB_{21}$ and the items of the database $DB_{22}$. That is, the virtual database constructs a database in which information of the data items Qx, ... which are not actually obtained from customers is estimated.

Here, if linear determination is adopted as a learning model which is applied to formularization between the items of the database $DB_{21}$ and the items of the database $DB_{22}$, determination analysis or the like is used. Otherwise, in case of a neural network, back provocation algorithm is used. Otherwise, in case of a rule form, recursive solution based on a determination tree is used.

To ask customers directly about their various hobbies, preferences, or senses of values is difficult in many cases due to problems of costs, privacy, and the like. However, if information is thus estimated about various items which the customer database lacks with use of a learning database and a virtual database, the same effects as obtained by a large database can be substantially obtained with low costs.

Also, a learning database can be expanded at any time by questionnaires or the like in accordance with various purposes such as direct marketing for a new product or service and the like.

Figure 6:
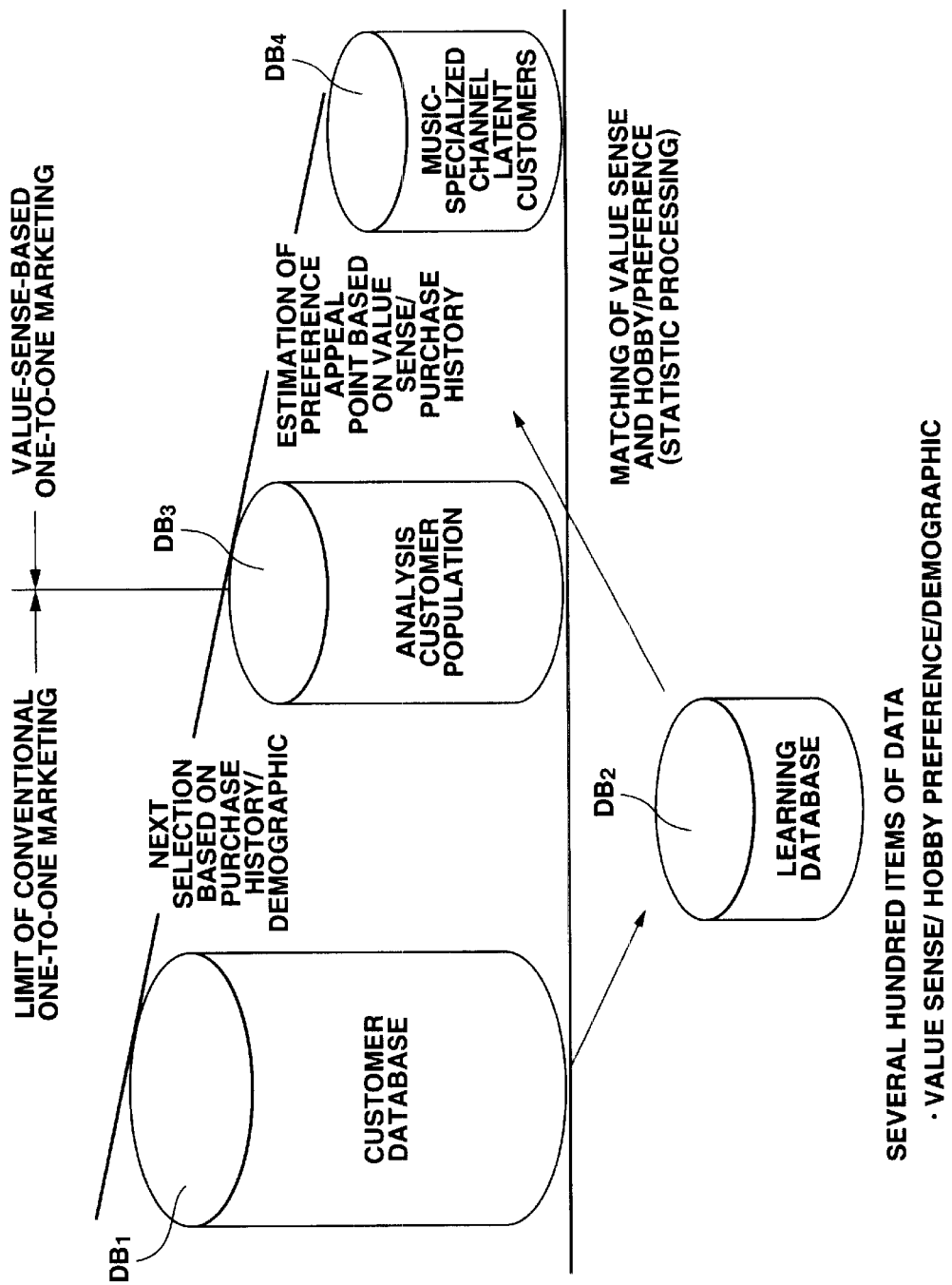
FIG. 6 is a view showing the procedure in a case of extracting latent customers by applying a learning database to an analysis customer population obtained from a customer database.

Next, specific explanation will be made of the case of extracting latent customers for a particular product or service from a customer database, with reference to FIG. 6. This example shows the case of extracting latent customers for a music-specialized channel, and latent customers $DB_4$ for the music-specialized channel are picked up in two stages from a customer database $DB_1$.

In the first stage, first selection among customers is applied, i.e., pre-sampling is carried out by means of information such as purchase history, gender, and age which can be obtained from the customer database $DB_1$. As a result of this, a database $DB_3$ containing an analysis customer population is prepared. For example, the customer database $DB_1$ is a database of a scale of 10,000,000 persons, and a database $DB_3$ containing an analysis customer population of several million scale is prepared by the selection as described above.

For example, the database $DB_3$ of the analysis customer population is narrowed to those customers who satisfy the items of "married in their thirties", "purchased a large television", "purchased stereo components", "tendency to purchase new products early", and the like. For example, conventional direct marketing enables extraction of customers up to this stage.

Next, by forecasting various characteristics of customers with use of a learning database $DB_2$, a database $DB_4$ of latent customers for a music-specialized channel is prepared, selected from a database $DB_3$ of analysis customer population. In this case, the learning database $DB_2$ consists of a database of a scale of 1,000 persons, for example.

By the selection as described above with use of the learning database $DB_2$, for example, a database $DB_4$ of latent customers for a music-specialized channel consists of customers who satisfy items such as "television is easy entertainment", "life without music cannot be considered", "excitement is wanted", "use of a music-specialized channel is intended", "popular music is preferred", and the like.

As described above, the customer information retrieving apparatus 1 extracts latent customers for a particular product or service by applying information of a learning database to a database of analysis customer population consisting of a customer database.

Although selection is divided into two stages in this example, the order of the stages may be inverted or the first stage may be omitted.

Next, procedures of processing in the learning database and processing in the customer database will be specifically explained with reference to FIG. 7. In the following explanation, each processing will be executed by the CPU 5.

Figure 7:
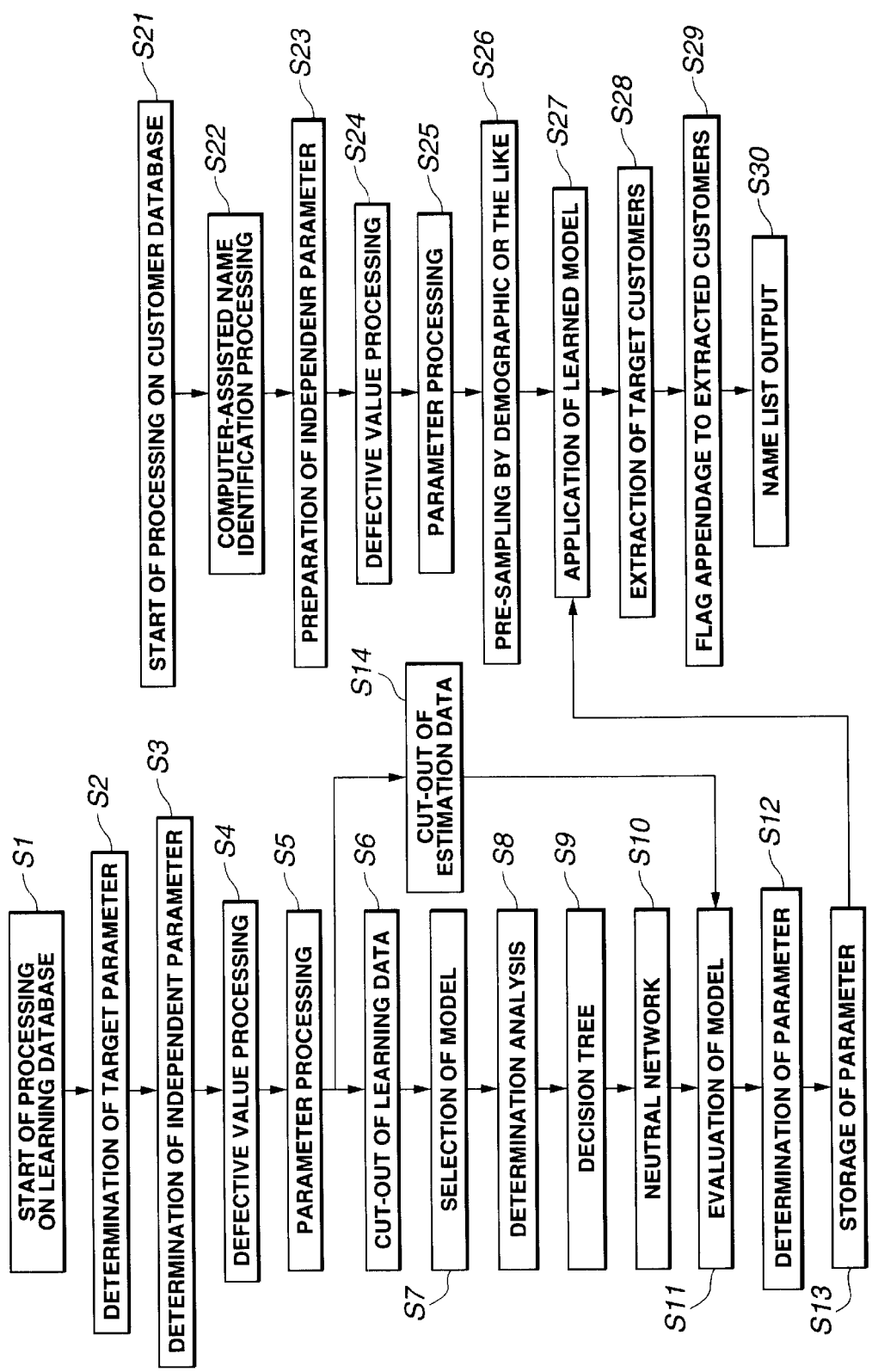
FIG. 7 is a flowchart showing the procedure of processing based on a learning database and the procedure of processing based on a customer database.

As shown in FIG. 7, in the learning database on which processing has been started in the step S1, a characteristic of the customers to be forecasted is selected from the items of the learning database by the CPU 5. Normally, this item is not contained in the customer database in cases of a new product or a new service. This selected item is the target parameter for learning.

Next, in the step S2, the CPU prepares an independent parameter as a parameter for forecasting the characteristic of customers. For example, profile items are extracted from items common to the learning data and the customer database.

Further, the CPU 5 executes defective value processing on the selected profile items, with respect to drops of data pieces, abnormal values, and the like, in the step S4. In the subsequent step S5, the CPU 5 executes parameter processing such as editing, synthesization, or the like, on the profile items, thereby to prepare final independent parameters.

Subsequently, in the steps S6 and S14, the CPU 5 divides the learning database into data (learning data) for finding a rule and evaluation data for an extracted rule.

From the data for finding a rule, the CPU 5 selects learning models in the step S7 and applies various learning models such as determination analysis (step S8), a decision tree (step S9), a neural network (step S10), and the like.

After learning models are thus applied, the CPU 5 selects the most effective learning model on the basis of the evaluation data and the application results of the learning models, in the step S11, and determines a parameter for a rule by means of the selected learning model, in the step S13. In the step S13, the CPU 5 stores the parameter of the rule.

Meanwhile, in the side of the customer database, the same independent parameter as prepared by the learning database is prepared by the same procedure as described above. As a result of this, the rule prepared by the learning database is completely applicable to the customer database.

Specifically, with respect to the customer database, processing is started in the step S21. In the step S22, computer-assisted name identification processing is carried out. Subsequently, the CPU 5 executes preparation of an independent parameter, defective value processing, and parameter processing in the steps S23 to S25, like the processing in the learning database.

After completion of these kinds of processing, the CPU 5 makes selection of customers, i.e., pre-sampling of customers, from the customer database, based on the demographic information, the purchase history information, and the like, in the step S26.

The CPU 5 executes selection of customers in the step S26 and thereafter applies a learning model obtained in the step S13 in the learning database processing.

By thus applying the learning model, the CPU 5 extracts customers as targets, i.e., latent customers, and then appends flags expressing extracted customers to the extracted customers. Further, the CPU 5 execute outputting of customers extracted in form of a name list or the like, in the step S30. The output in form of a name list is attained by a monitor, a printer, or the like which forms the output section 3.

The above explains the structure of the customer information retrieving apparatus 1 and the procedure of processing achieved by the apparatus. The customer information retrieving apparatus 1 uses customer inner information consisting of information concerning the mental side of customers such as senses of values, in addition to customer outer information consisting of behavior history such as purchase history or the like, and further estimates information which cannot be directly obtained from customers, thereby to improve the accuracy in extracting a rule concerning customers.

That is, for example, the customer information retrieving apparatus 1 refers to inner data (FIG. 8(B)) consisting of information concerning personalities, such as awareness of media and life style characteristics, in addition to outer data (FIG. 8(A)) consisting of demographic information such as gender, age, family, and the like and behavior history such as AV device purchase history, service purchase history, and the like, thereby to improve the accuracy in extracting a rule. Thus, desired customer information is extracted. In this manner, for example, it is possible to provide contents, services, and products which are suitable for respective customers (FIG. 8(C)).

Also, the customer information retrieving apparatus 1 is capable of ranking customers in a database, depending on their potentials with respect to a particular product or service. As a result of this, a number of persons that are necessary for marketing can be picked up in the order from the highest potential or those customers that have potentials equal to or higher than a predetermined threshold value can be picked up, so that direct approach can be taken. Accordingly, efficient marketing can be realized.

Figure 9:
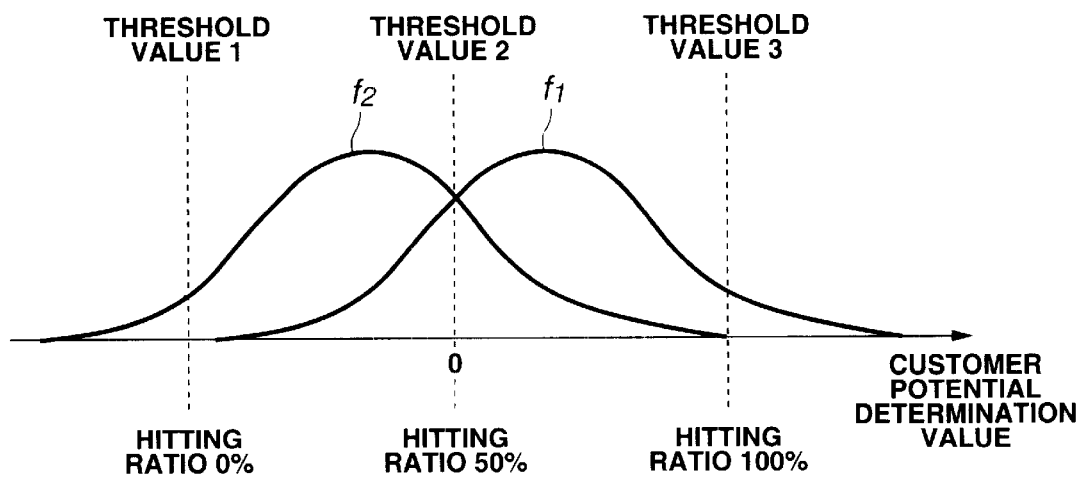
FIG. 9 is a characteristic graph showing the relationship between the potential of a customer and the hitting ratio of a latent customer.

Suppose that purchase applicants for a product or service are extracted, for example. Also, suppose that FIG. 9 shows a distribution of potentials in case where a potential calculation formula is obtained as a linear determination function concerning purchase applicants and purchase non-applicants. For example, a function f1 depending on the purchase applicants for a product or service is obtained from a set of customers who highly desire to use a music-specialized channel, and a function f2 is obtained from a set of customers who do not want to use the music-specialized channel.

In this case, the hitting ratio with respect to purchase request is approximately 0% if customers having potentials close to the threshold value 1 are selected. However, if customers having potentials close to the threshold value 2 are selected, the hitting ratio is approximately 50%. Further, if customers having potentials equal to or higher than the threshold value 3 are selected, the hitting ratio is approximately 100%. By thus supposing a distribution of hitting ratios, a necessary number of latent customers can be picked up from a large-scale customer database. For example, 9,000 persons are hitting latent customers, in case where direct mails are sent to 10,000 persons supposing that the hitting ratio is 90% when upper-ranking 10,000 persons are extracted from a customer database of 100 million persons. In other words, when 9,000 customers are required, direct mails need to be sent to 10,000 persons.

Figure 10:
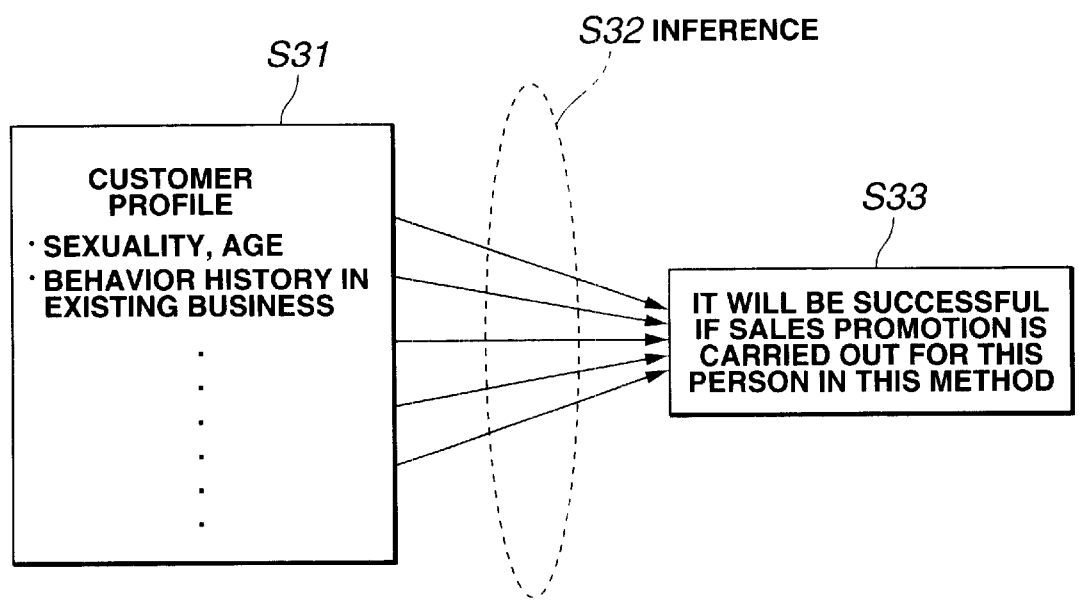
FIG. 10 is a view used for explaining marketing which is enabled by a customer information retrieving apparatus.

Further, by making an inference about information concerning customers with use of a learning database, latent customers can be extracted properly. For example, marketing can be achieved in the procedure as shown in FIG. 10.

Customer profile information is selected (step S31), and inference is made on the basis of the customer profile information (step S32). In this case, for example, the inference adopts a data mining method.

Further, a flow representing predicted success if sales promotion is carried out for this person in this method is obtained.

Thus, a rule obtained from a learning database is applied to estimate information concerning customers. As a result, proper extraction of latent customers is enabled, and marketing strategies can become more effective.

That is, by extracting a rule in the data items contained in the customer database and for the data items not contained in the customer database, it is possible to utilize an existing database for new business. Further, since data items which do not exist in the customer database are estimated by using a learning database upon requirements without directly asking customers a question, the substantial database can be expanded at low costs, without infringing on privacy and without expanding the capacity of the storage device.

Next, explanation will be made of an embodiment in which the hitting ratio of extracting latent customers is measured under a theme of finding latent customers for a music-specialized channel, through computer simulation. Computer simulation is carried out by adopting determination analysis of a linear model. Note that computer simulation is not limited to use of a linear model but may be carried out by adopting a different learning model such as a decision tree or the like.

Figure 11:
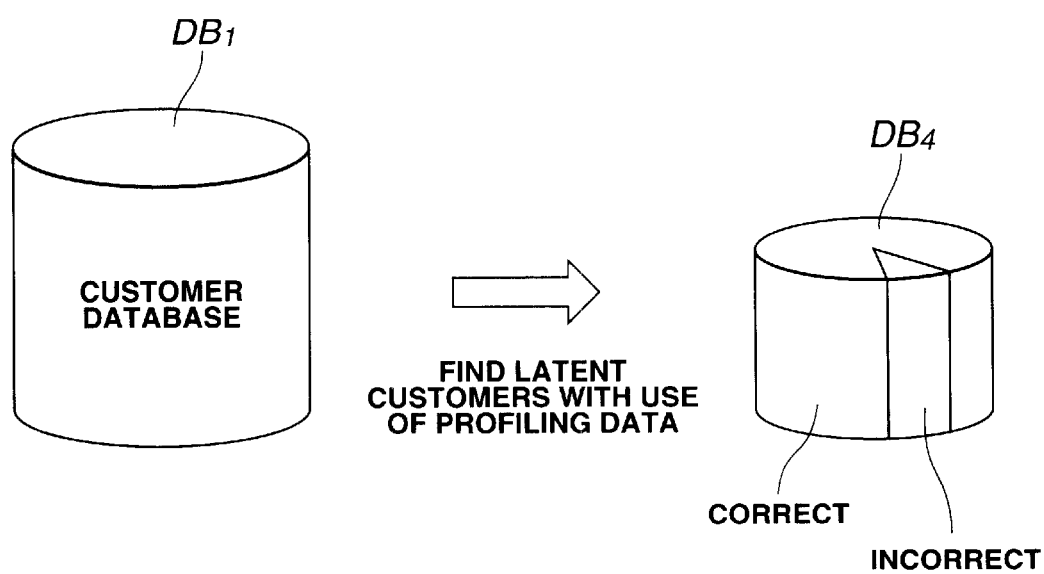
FIG. 11 is a view used for explaining the hitting ratio in case where a database consisting of latent customers is prepared from a customer database.

As shown in FIG. 11, in the case where latent customers for a specific product or service are retrieved with use of profiling data from the customer database $DB_1$, a significant problem is the hitting ratio at which the latent customers become secure latent customers in the database $DB_4$ consisting of extracted latent customers. In the present embodiment, explanation will be made mainly of the hitting ratio.

In the present embodiment, parameters are set as follows.

As profile data, AV device purchase history, demographic information, personality data, and rental video/CD purchase frequency are used as shown in the following Table 1, for example.

TABLE 1

| Profile information |
| --- |
| AV device purchase history |
| Demographic |
| Personality data |
| Rental video/CD purchase frequency |

With respect to the AV device purchase history, parameters such as a wide television, a high-vision television, . . . are used as shown in the following Table 2, for example.

TABLE 2

| | |
| --- | --- |
| 1. | Wide television |
| 2. | High-vision television |
| 3. | Video projector |
| 4. | Small liquid crystal color television |
| 5. | Color television 14 or lower inches |
| 6. | Color television 15 to 21 inches |
| 7. | Color television 22 to 29 inches |
| 8. | Color television 30 to 34 inches |
| 9. | Color television 35 or higher inches |
| 10. | Satellite broadcasting antenna |

With respect to the personality data, parameters such as "I wish to watch what I cannot watch with my eyes" and "Working time can be shortened so I can have margins for life or time" are used for the item of the way of thinking about information communication as shown in the following Table 3, for example.

TABLE 3

| Way of thinking about information communication 1 |
| --- |
| *I wish to watch what I cannot watch with my eyes. |
| *Working time can be shortened so I can have margins for life or time. |
| Way of thinking about information communication 2 |
| *I wish to know details about my interest at any fee. |
| *I have my original way of collecting information. |
| *I do not wish to be left alone from computerization of society. |
| *I think that word-of-mouth information in my circle is important. |

Figure 12:
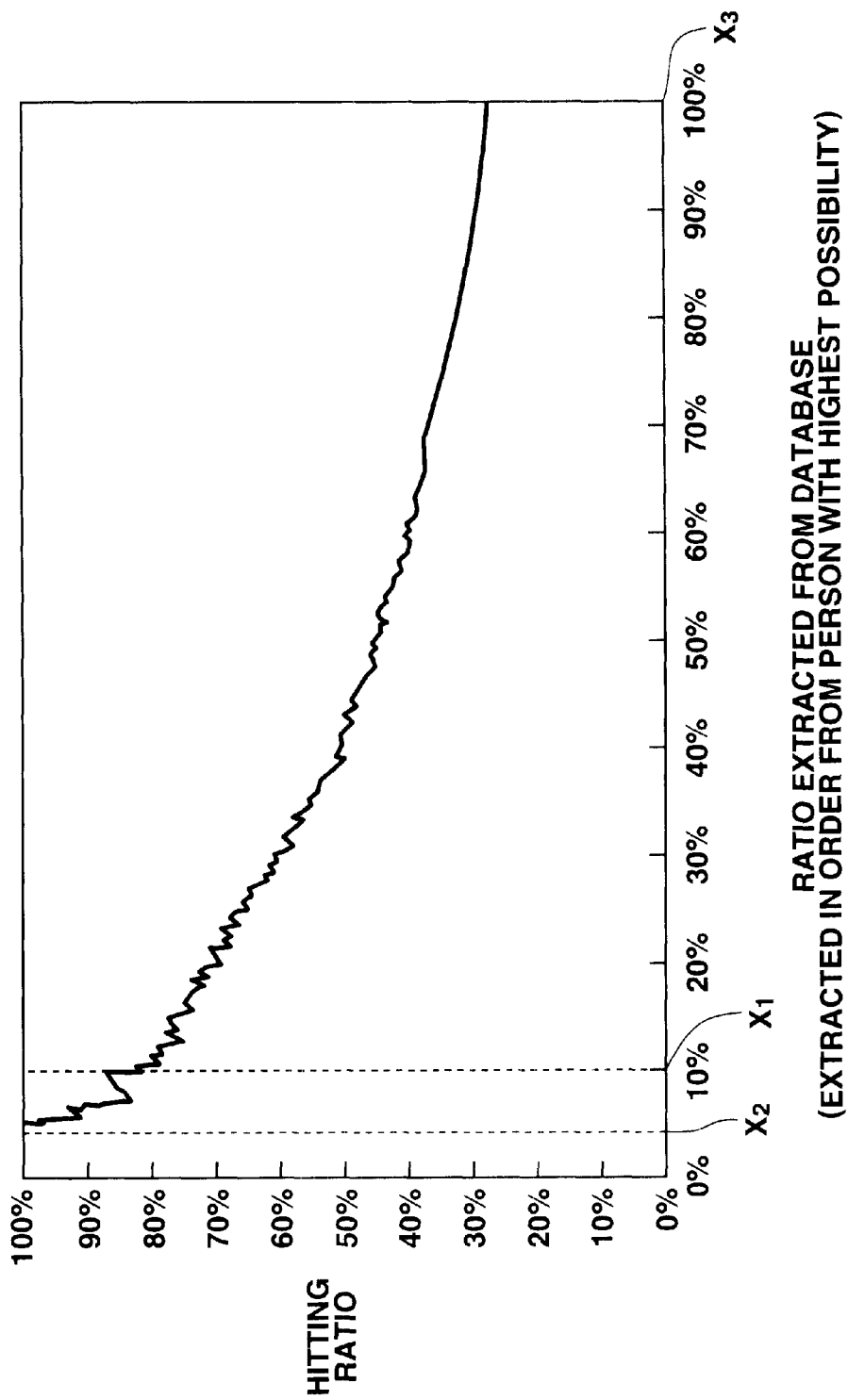
FIG. 12 is a characteristic graph showing the relationship between an extracted latent customer and the hitting ratio of being a certain latent customer, and also showing a result of an embodiment to which the present invention is applied.

FIG. 12 shows a result obtained from computer simulation with use of the parameters as described above. The lateral axis of the graph of FIG. 12 represents the ratio extracted from the database of latent customers, and the ratio is extracted in the order from the person with the highest possibility. That is, as the ratio is closer to 0%, the customer becomes more certainly a latent customer for a music-specialized channel. The longitudinal axis represents the hitting ratio.

In the result shown in FIG. 12, if persons with the ratio 10% are selected (at the value $X_1$), latent customers can be extracted with a probability 90%. Further, if persons with the ratio 5% (at the value $X_2$) are selected, latent customers can be extracted substantially with a probability 100%.

Note that latent customers can be extracted with a probability 25% in case where persons are selected at random (at the value $X_3$ (100%)).

Figure 13:
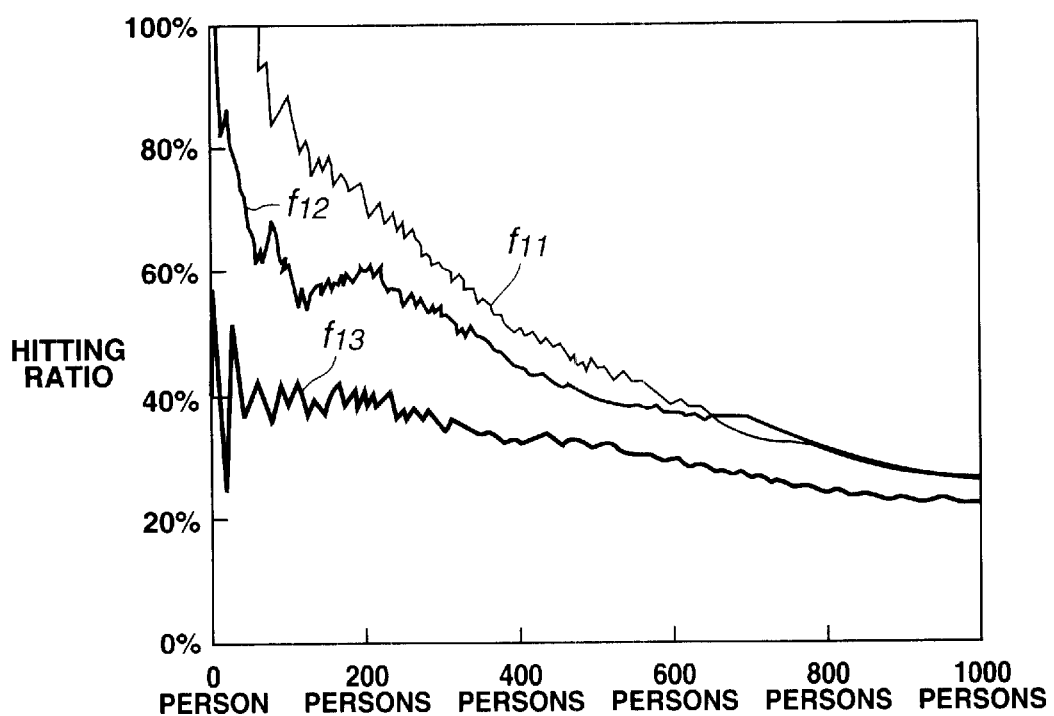
FIG. 13 is a characteristic graph showing the relationship between an extracted latent customer and the hitting ratio of being a certain latent customer, and also showing an example of comparison between a result of an embodiment to which the present invention is applied and a result of a conventional case.

FIG. 13 shows a comparative example. FIG. 13 shows results of a change $f_{12}$ in the hitting ratio obtained only from personality data and a change $f_{13}$ in the hitting ratio obtained from the number of times for which rental CD/VIDEO has been used and from demographic information, in comparison with the change $f_{11}$ in the hitting ratio if the present invention shown in FIG. 12 is applied. Note that the lateral axis of the graph shown in FIG. 13 represents the number of extracted persons. As the number is smaller, the extracted persons are customers who become more certainly latent customers for a music-specialized channel.

As shown in FIG. 13, even if those customers that have used CD/VIDEO rental services for a large number of times are picked up, i.e., even if heavy users of rental CD/VIDEO services are picked up (e.g., in the case where picked-up persons approximate to the first one at $f_{13}$), the hitting ratio is left to be low. It has been thus found out that a significant difference appears from the hitting ratio obtained from a learning model to which the present invention is applied.

The factors which thus caused accurate pick-up of latent customers will be, for example, adoption of profile data with a high degree of freedom, aiming principally entertainment, and adoption of personal approach by which individual persons are analyzed without adopting cluster approach which seeks for rough tendencies.

Thus, in the results of the embodiment based on computer simulation, the hitting ratio can be increased by applying the present invention, and latent customers can be picked up with a probability of approximately 100%. The customer information retrieving apparatus 1 thus enables accurate extraction of latent customers for a particular product or service.

What is claimed is:

1. A database used for retrieving customer information comprising:
    a customer database storing a plurality of data items;
    a learning database storing data items common to said customer database and data items not stored in said customer database; and
    a virtual database storing inherent data items inherent to said learning database;
    wherein,
        said inherent data items are obtained by estimation using a learning model to said data items common to said customer database and said data items not stored in said customer database, said estimation being performed via a recursive solution based on a determination tree or via a back provocation algorithm;
        said data items of said customer database comprise responses to questions by customers listed in said customer database; and
        said data items in said learning database not stored in said customer database comprise responses to different questions by persons extracted at random or on a classification basis.

2. The database of claim 1 wherein said estimation to obtain said inherent data comprises applying a plurality of different learning models to said first data and selecting the most effective learning model on the basis of evaluation data and application results of the learning models, and determining a parameter of a rule by means of the selected learning model.

3. A computer-implemented method of generating a virtual database for retrieving customer information, comprising the steps of:
    generating a customer database storing a plurality of first data items for each of a plurality of customers;
    generating a learning database storing data items common to said customer database and second data items not stored in said customer database; and
    estimating inherent data items of said learning database and storing said estimated data items in a virtual database;
    wherein,
        said estimating is performed using a learning model to said first data items common to said customer database and said second data items not stored in said customer database, said estimating being performed via a recursive solution based on a determination tree or via a back provocation algorithm;
        said first data items of said customer database comprise responses to questions by customers listed in said customer database; and
        said second data items in said learning database not stored in said customer database comprise responses to different questions by persons extracted at random or on a classification basis.

4. The method of claim 3 wherein said estimating comprises applying a plurality of different leaning models to said first data and selecting the most effective learning model on the basis of evaluation data and application results of the learning models, and determining a parameter of a rule by means of the selected learning model.

* * * * *